US009961598B2

(12) United States Patent
Hoidis et al.

(10) Patent No.: US 9,961,598 B2
(45) Date of Patent: May 1, 2018

(54) OPTIMIZED MEASUREMENT REPORT ORDER FOR INTER-RAT HANDOVER

(71) Applicant: QUALCOMM Incorporated, San Diego, CA (US)

(72) Inventors: Jochen Hoidis, Nuremberg (DE); Renata Carrilho Braz, Nuremberg (DE); Akos Ferenc Kezdy, Nuremberg (DE); Matthias Schulist, Erlangen (DE)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 15/070,638

(22) Filed: Mar. 15, 2016

(65) Prior Publication Data

US 2017/0272988 A1 Sep. 21, 2017

(51) Int. Cl.
*H04W 36/00* (2009.01)
*H04W 36/14* (2009.01)

(52) U.S. Cl.
CPC ....... *H04W 36/0088* (2013.01); *H04W 36/14* (2013.01)

(58) Field of Classification Search
CPC .......................... H04W 36/0088; H04W 36/14
See application file for complete search history.

(56) References Cited

U.S. PATENT DOCUMENTS

| 5,491,802 | A | 2/1996 | Thompson et al. |
| 5,722,072 | A | 2/1998 | Crichton et al. |
| 6,172,990 | B1 | 1/2001 | Deb et al. |
| 6,996,105 | B1 | 2/2006 | Wilson |
| 7,313,116 | B2 | 12/2007 | Lee et al. |
| 2008/0176565 | A1 | 7/2008 | Eerolainen et al. |
| 2009/0191862 | A1* | 7/2009 | Amirijoo .......... H04W 36/0083 455/424 |
| 2011/0065433 | A1* | 3/2011 | Iwamura .......... H04W 36/0088 455/434 |
| 2011/0081903 | A1 | 4/2011 | Cai et al. |

(Continued)

FOREIGN PATENT DOCUMENTS

| EP | 1916858 A1 | 4/2008 |
| EP | 2056639 A2 | 5/2009 |

OTHER PUBLICATIONS

International Search Report and Written Opinion—PCT/US2017/022322—ISA/EPO—Jun. 16, 2017.

*Primary Examiner* — Duc C Ho
(74) *Attorney, Agent, or Firm* — Arent Fox LLP

(57) ABSTRACT

To carry out inter-RAT handover to the strongest neighbor cell, a method, a computer-readable medium, and an apparatus are provided. The apparatus determines a measurement configuration relating to handover from a cell of a source RAT to a cell of one or more target RATs. The apparatus detects trigger events associated with a first cell and a second cell of the one or more target RATs and a serving cell of the source RAT based on the measurement configuration. The apparatus may prioritize the second cell over the first cell in response to the detected trigger events, e.g., based on the received signal strength of the cells. The apparatus may generate a MRM for each of the first cell and the second cell. The MRM for the second cell may be sent to the serving cell before the MRM for the first cell is sent to the serving cell.

30 Claims, 7 Drawing Sheets

(56) References Cited

U.S. PATENT DOCUMENTS

| | | |
|---|---|---|
| 2011/0188471 A1 | 8/2011 | Kim |
| 2013/0148600 A1 | 6/2013 | Moulsley et al. |
| 2014/0146794 A1* | 5/2014 | Dalsgaard ............... H04W 8/02 |
| | | 370/332 |
| 2014/0254399 A1 | 9/2014 | Yang et al. |
| 2015/0094069 A1 | 4/2015 | Gopal et al. |
| 2015/0281989 A1 | 10/2015 | Yang et al. |
| 2016/0234746 A1* | 8/2016 | Gopal ................... H04W 36/26 |
| 2017/0135000 A1* | 5/2017 | Cai ................... H04W 36/0072 |

* cited by examiner

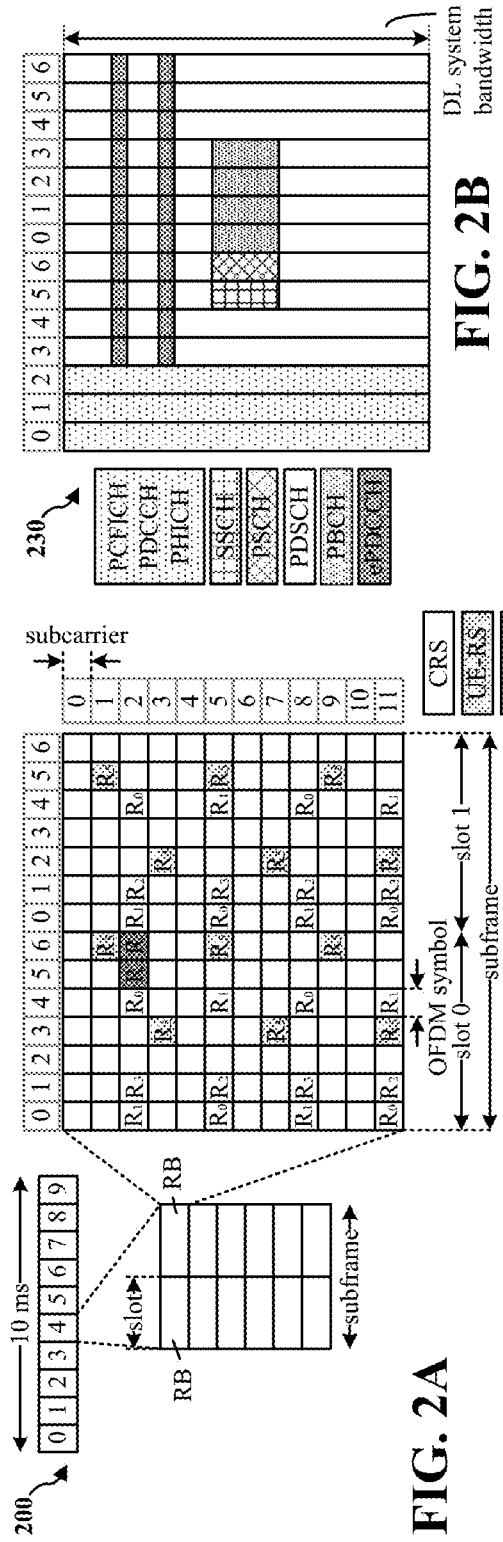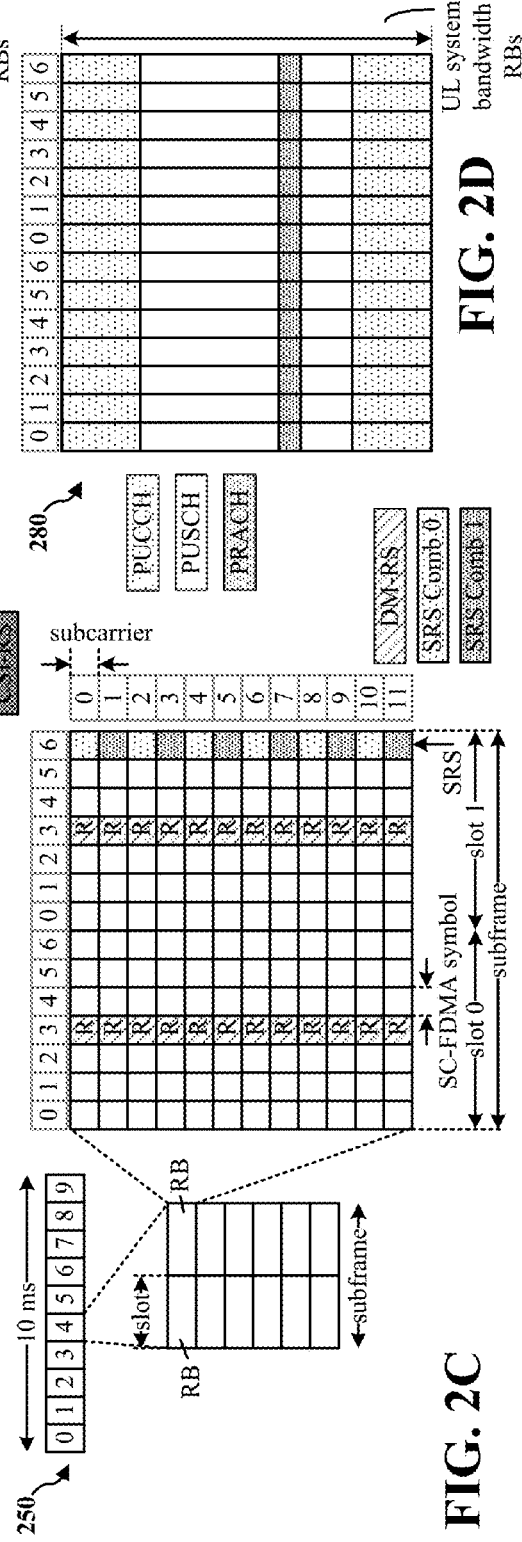

OPTIMIZED MEASUREMENT REPORT ORDER FOR INTER-RAT HANDOVER

BACKGROUND

Field

The present disclosure relates generally to communication systems, and more particularly, to inter-RAT handover.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

A radio access technology (RAT) is the underlying physical connection method for a radio based communication network. Many modern phones such as smart phones support several RATs in one device such as Bluetooth, Wi-Fi, and 3G, 4G or LTE. RAT can be GSM, CDMA, WiMAX, LTE, TD-SCDMA or any other wireless technology used to provide air interface to mobile devices to obtain various services (voice, email, internet, VOIP). A mobile device associated with one RAT may have a neighbor cell associated with a different RAT. The mobile device may perform neighbor cell measurements and send a measurement report to the network. Based on the measurement report provided by the mobile device, the network may initiate handover from the current RAT to the other RAT, which is referred to as inter-RAT handover.

The network may receive several measurement reports for several different neighbor cells at around the same time. The network may use the first measurement report received to initiate handover to the neighbor cell associated with the first measurement report. Thus the network might not carry out the inter-RAT handover to the strongest neighbor cell, but just to the first reported neighbor cell.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A UE within a serving cell of one RAT may perform measurements for two neighbor cells of different RAT(s). The two neighbor cells may be different in signal strength but both may fulfill the triggering condition associated with the target RAT. As soon as the triggering condition associated with the serving cell is also fulfilled, measurement report messages (MRMs) for the target cells may be generated and sent by the UE. The order in which the MRMs are sent is not defined per standard. Although the MRMs may reach the network one after the other, the network may respond based on the first MRM received. Thus, the network might not carry out the inter-RAT handover to the strongest neighbor cell, but rather perform inter-RAT handover to the first reported neighbor cell.

In an aspect of the disclosure, a method, a computer-readable medium, and an apparatus of wireless communication are provided. The apparatus may be a UE. The apparatus determines a measurement configuration relating to handover from a cell of a source RAT to a cell of one or more target RATs. The source RAT may be different from the one or more target RATs. The apparatus detects trigger events associated with a first cell and a second cell of the one or more target RATs and a serving cell of the source RAT based on the measurement configuration. In one configuration, the first cell and the second cell may be associated with different frequency bands. The apparatus prioritizes among the first cell and the second cell in response to the detected trigger events. In one configuration, the second cell is prioritized over the first cell and the prioritization is based at least in part on the received signal strength of the second cell exceeding the received signal strength of the first cell. The apparatus generates at least one MRM based on the result of the prioritizing. The at least one MRM is sent to the serving cell of the source RAT. In one configuration, to generate the at least one MRM, the apparatus may generate a MRM for each of the first cell and the second cell. The MRM for the second cell may be sent to the serving cell of the source RAT before the MRM for the first cell is sent to the serving cell of the source RAT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
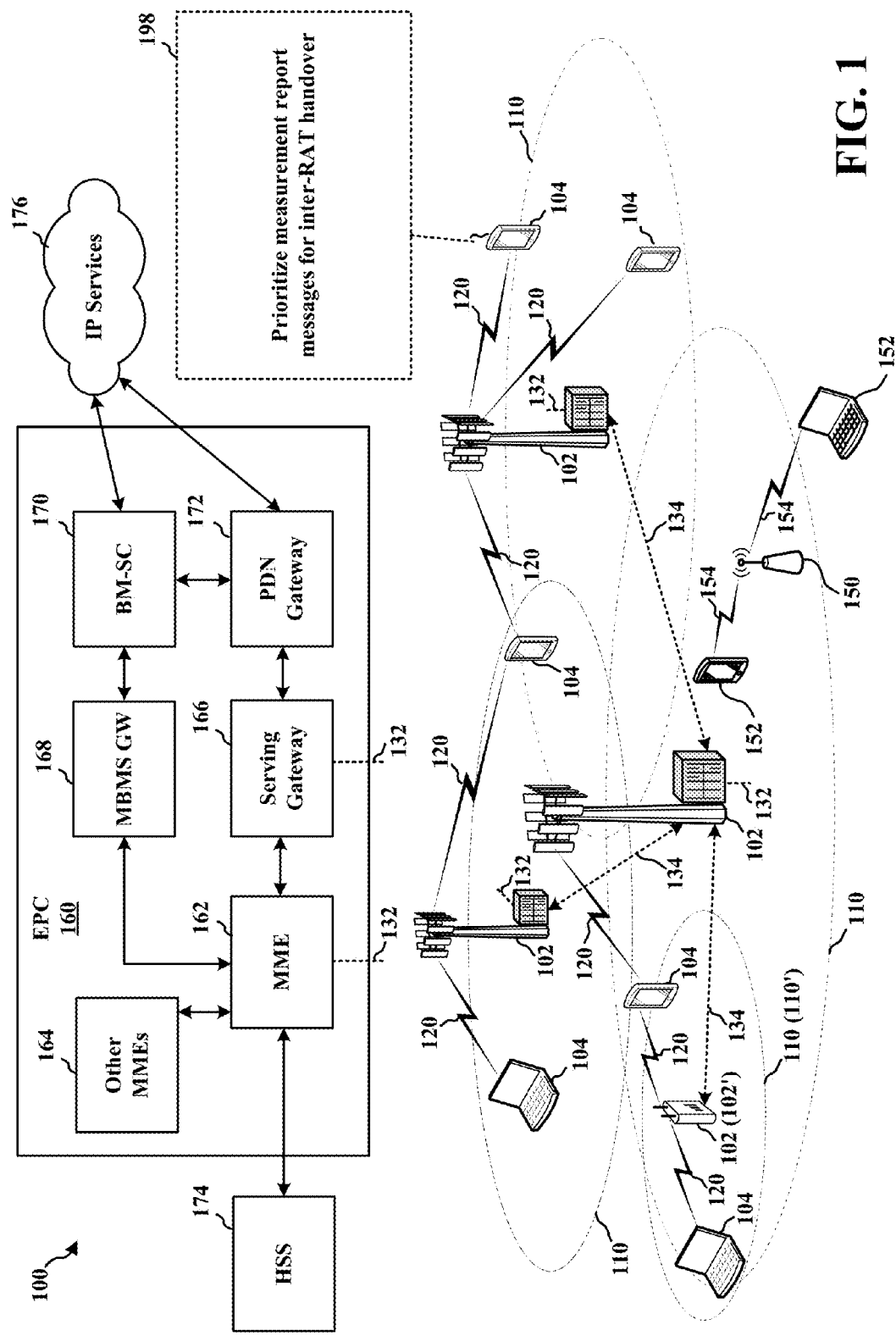
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to prioritize (198) measurement report messages (MRMs) for inter-RAT handover. Details of the operations performed at 198 are described below with reference to FIGS. 4-7.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
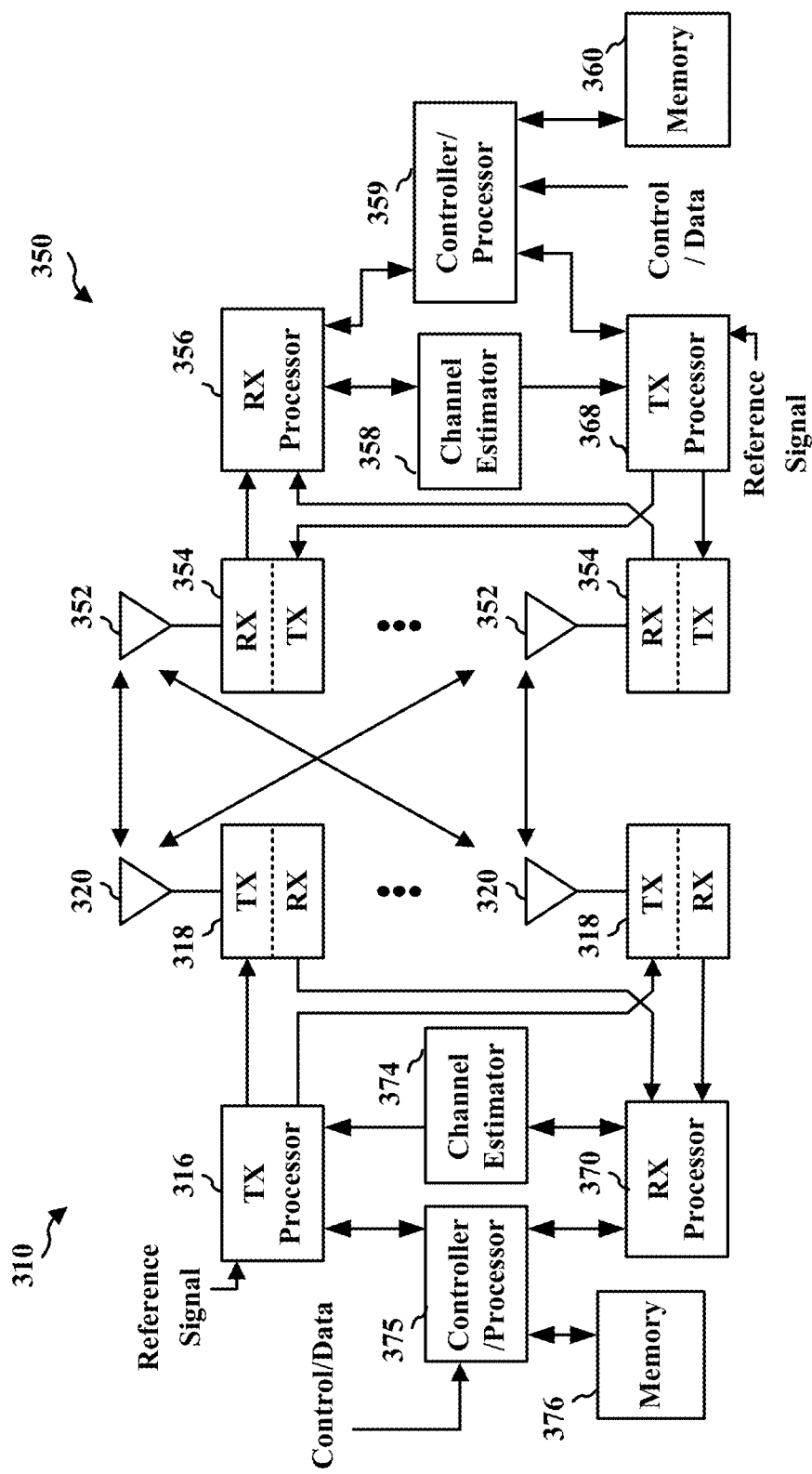
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Many modern mobile networks may include different radio access technologies deployed on different frequency bands. Even the same RAT may be deployed on different frequency bands. An inter-RAT handover from 4G (e.g., LTE) network to 3G (e.g., UMTS) or 2G (e.g., GSM/GPRS) network, and vice versa, may be needed, e.g., for voice call continuity. To provide the network with the knowledge of a suitable target cell for handover, different measurements may be defined with unique measurement identities (IDs) that refer to certain measurement objects and report configurations. Measurement objects are the objects on which the UE performs measurements (e.g., the frequencies and cells that are to be measured). For example, measurement objects may include intra-frequency and inter-frequency intra-RAT neighbors, and inter-RAT neighbors. The measurement objects may include a list of cells to be considered, and parameters associated with, e.g., frequency or cell-specific offsets. The measurement objects may also include a list of cells to be avoided.

Reporting configurations include the criteria used by the UE to trigger the transmission of a measurement report and details on what information to expect the UE to include in the report (e.g., quantities such as RSCP or RSRP, and the number of cells). This trigger may be periodical or event-based. Each measurement ID is an identifier that links one measurement object with one reporting configuration. The measurement identity is used as a reference number in the measurement report.

Measurement objects, reporting configurations, and measurement IDs may be part of a measurement configuration.

In one aspect, when a UE is in RRC-CONNECTED mode, the measurement configuration may be provided to the UE by dedicated signaling, e.g., using the RRCConnectionReconfiguration message. In one aspect, the UE may measure signal strength of the cells based on the measurement configuration received from the network (e.g., through the serving cell). In one aspect, the signal strength of a cell may be obtained by measuring received signal strength indication (RSSI) and/or received signal code power (RSCP) of the reference signal from the cell. In one aspect, a measurement report may be transmitted using a measurement report message (MRM).

In one aspect, when the transmission of the measurement report is event-based, the relevant event to trigger an inter-RAT handover may occur when the serving cell (e.g., an LTE cell) becomes worse than a first defined threshold, while the target cell (e.g., a cell using another RAT) becomes better than a second defined threshold. This event may also be referred as Event B2. In one configuration, Event B2 may only be triggered when the serving cell becomes worse than the first defined threshold and the target cell becomes better than the second defined threshold for a pre-defined time period (may be referred to as time-to-trigger) associated with the serving cell.

For different target RATs, different triggering conditions/values may be used for the serving cell threshold in order to trigger Event B2. However, there may be no distinction for target cells of the same RAT operating on different frequency bands (e.g., UMTS 900 and UMTS 2100) in order to trigger Event B2. This can lead to a situation in which the UE performs successful measurements for defined UMTS900 neighbors and U2100 neighbors, which are different in signal strength but which both fulfill the triggering condition of the Event B2 threshold for the target RAT. As soon as the triggering condition of the Event B2 threshold for the serving cell is also fulfilled (for the relevant time-to-trigger), MRMs for inter RAT, e.g., UMTS, target cells will be generated and sent by the UE. The order in which the MRMs are sent is not defined by existing wireless standards. Although the MRMs may reach the network one after the other, the network may react on the first MRM received, and thus might not carry out the inter-RAT handover to the strongest neighbor, but rather to the first reported neighbor cell.

Figure 4:
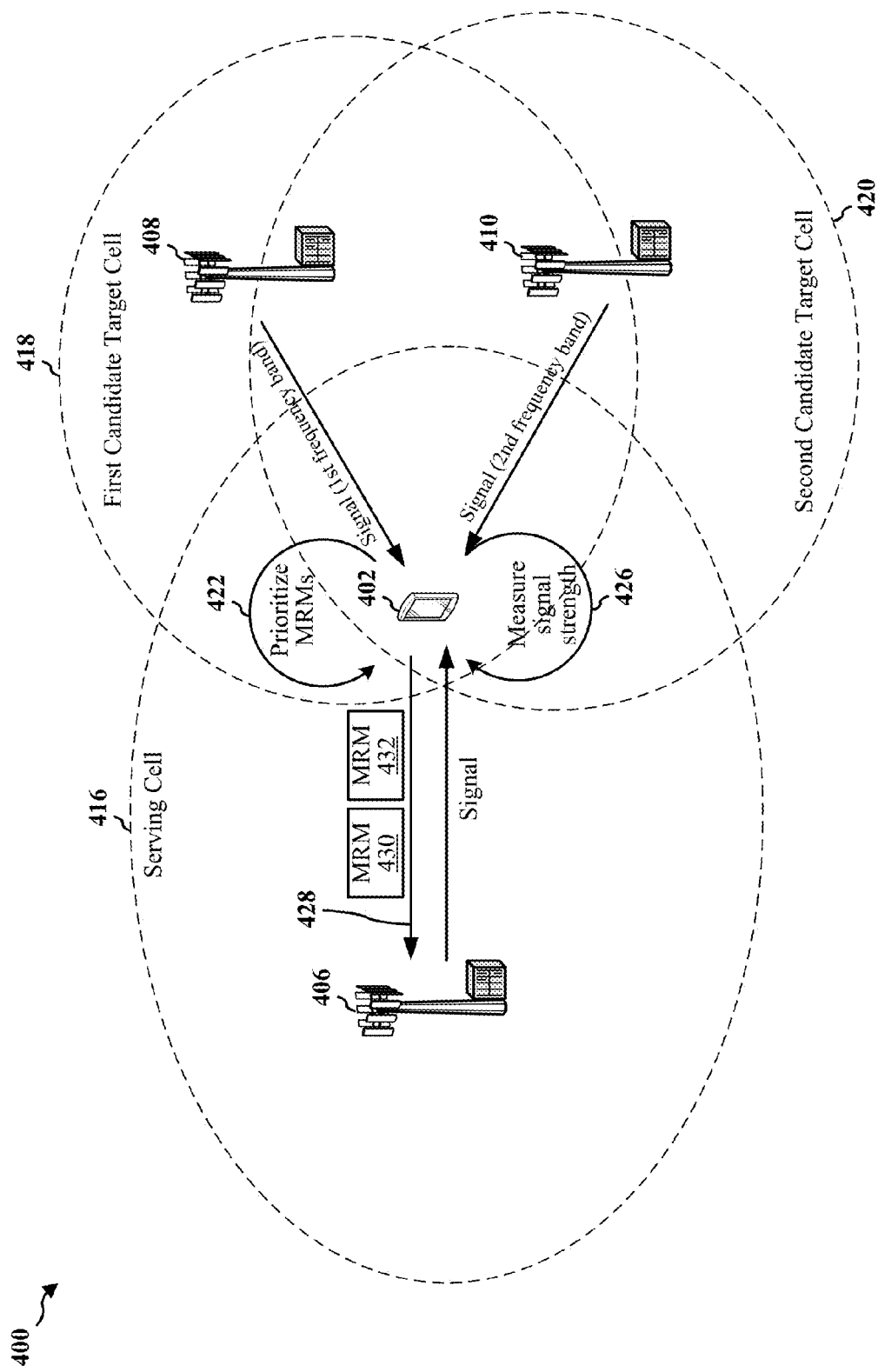
FIG. 4 is a diagram illustrating an example of a prioritized measurement report order for inter-RAT handover in a wireless communication system.

FIG. 4 is a diagram illustrating an example of a prioritized measurement report order for inter-RAT handover in a wireless communication system 400. In this example, a UE 402 camps on a serving cell 416 and receives a signal transmitted by the serving cell 416 of a base station 406. The serving cell 416 uses a source RAT. At the same time, the UE 402 may also receive a signal from a first candidate target cell 418 of a base station 408, and another signal from a second candidate target cell 420 of a base station 410. In one configuration, the first candidate target cell 418 may use a first target RAT and the second candidate target cell 420 may use a second target RAT. In such configuration, the first target RAT and the second target RAT may or may not be the same RAT, even though both the first target RAT and the second target RAT are different from the source RAT. In one configuration, the first target RAT and the second target RAT may be on different frequency bands. For example, the first target RAT may be on a first frequency band (e.g., UMTS 900) and the second target RAT may be on a second frequency band (e.g., UMTS 2100).

In one configuration, the UE 402 may be the UE 104 or 350 described above. The UE 402 may measure (at 426) the signal strengths of each of the serving cell 416, the first candidate target cell 418, and the second candidate target cell 420. In one configuration, the UE 402 may perform the measurements based on a measurement configuration received from the base station 406 through dedicated signaling, e.g., using the RRCConnectionReconfiguration message. In one configuration, the signal strength of a cell may be obtained by measuring received signal strength indication (RSSI) and/or received signal code power (RSCP) of a reference signal from the cell.

In one configuration, when the triggering condition of the Event B2 threshold for both the first candidate target cell 418 and the second candidate target cell 420 are fulfilled, and the triggering condition of the Event B2 threshold for the serving cell 416 is also fulfilled, the UE 402 prioritizes (at 422) the order of sending MRMs associated with the first candidate target cell 418 and the second candidate target cell 420. The UE 402 then sends (at 428) the prioritized MRMs 430 and 432 to the serving cell 416.

In one configuration, the prioritization of the order of sending MRMs may be based on the measured signal strength of each target cell. For example, if the signal strength of the first candidate target cell 418 is stronger than the signal strength of the second candidate target cell 420, the MRM for the first candidate target cell 418 may be send to the base station 406 before the MRM for the second candidate target cell 420 is sent to the base station 406. This may ensure that the MRM for the strongest candidate target cell is sent out first so that the network may pick the strongest candidate target cell for handover.

In one configuration, when the first candidate target cell 418 and the second candidate target cell 420 use different target RATs and the triggering condition of the Event B2 threshold for both the first candidate target cell 418 and the second candidate target cell 420 are fulfilled, and the triggering condition of the Event B2 threshold for the serving cell 416 is also fulfilled, the prioritization of the order of sending MRMs may be based on a configuration of the UE 402. For example, if the first candidate target cell 418 is preferred over the second candidate target cell 420 according to the configuration of the UE 402, the MRM for the first candidate target cell 418 may be send to the base station 406 before the MRM for the second candidate target cell 420 is sent to the base station 406. In one configuration, the configuration of the UE 402 may be based on a preference of the UE 402. In another configuration, the configuration of the UE 402 may be based on information from the network (e.g., idle mode reselection priorities broadcast by the network), in conjunction with or instead of the preference of the UE 402. In one configuration, the configuration of the UE 402 may include a preference for service in a target RAT of the first candidate target cell 418 or second candidate target cell 420, an idle mode reselection criteria relating to the first candidate target cell 418 or second candidate target cell 420, a network setting, or any combination thereof.

Figure 5:
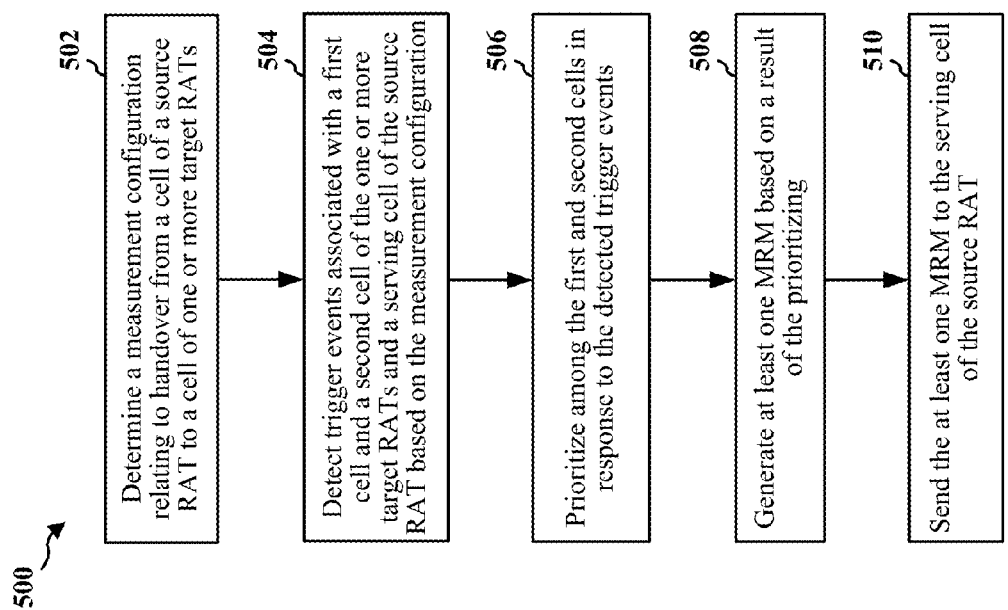
FIG. 5 is a flowchart of a method of wireless communication.

FIG. 5 is a flowchart 500 of a method of wireless communication. The method may be performed by a UE (e.g., the UE 104, 350, 402, or the apparatus 602/602'). At 502, the UE may determine a measurement configuration relating to handover from a cell of a source RAT (e.g., 416) to a cell of one or more target RATs (e.g., 418 or 420). In one configuration, the source RAT may be different from the one or more target RATs. In one configuration, the UE may receive the measurement configuration from the serving cell through dedicated signaling, e.g., by the RRCConnection-Reconfiguration message. The measurement configuration may include measurement objects, reporting configurations, and measurement IDs. In one configuration, the measurement configuration may include one or more thresholds relating to a received signal strength of signals from cells in the respective source and target RATs. In one configuration, the measurement configuration may include the same threshold for the first cell and the second cell of the one or more target RATs. In one configuration, to determine the measurement configuration, the UE may determine which frequency and which cell are to be measured based on the received measurement objects, and use received reporting configurations to set thresholds used to detect event occurrence and to define what information is to be included in the measurement report.

At 504, the UE detects trigger events associated with a first cell (e.g., 418) and a second cell (e.g., 420) of the one or more target RATs and a serving cell (e.g., 416) of the source RAT based on the measurement configuration. In one configuration, the trigger events may be the triggering condition of the Event B2 threshold for both the first cell and the second cell are fulfilled, and the triggering condition of the Event B2 threshold for the serving cell is also fulfilled. In one configuration, the first cell and the second cell may be associated with different frequency bands. In one configuration, the different frequency bands may be associated with the same target RAT (e.g., UMTS 900 and UMTS 2100).

For example and in one configuration, the UE may measure signal strength of the first cell to be a, the signal strength of the second cell to be b, and the signal strength of the serving cell to be c. The triggering condition of the Event B2 threshold for the target RAT associated with the first cell is x, the triggering condition of the Event B2 threshold for the target RAT associated with the second cell is y (x and y may be the same if the first cell and the second cell are associated with the same target RAT), and the triggering condition of the Event B2 threshold for the source RAT is z. If the measured signal strength a of the first cell satisfies threshold x, the measured signal strength b of the second cell satisfied threshold y, and the measured signal strength c of the serving cell satisfied threshold z, the trigger events associated with the first cell, the second cell, and the serving cell are detected.

At 506, the UE prioritizes the first cell and the second cell in response to the detected trigger events. In one configuration, the second cell is prioritized over the first cell based at least in part on the received signal strength of the second cell exceeding the received signal strength of the first cell. In one configuration, the prioritization is performed during the time-to-trigger interval associated with the serving cell of the source RAT.

At 508, the UE generates at least one MRM based on the result of the prioritizing. In one configuration, the at least one MRM is a single MRM for the second cell that is prioritized over the first cell. In one configuration, each MRM may include measurement reports regarding the serving cell and a target cell. For example, the MRM for the first cell may include measurement reports regarding the serving cell and the first cell. In one configuration, the information included in a measurement report may be defined by the reporting configurations.

At 510, the UE sends the at least one MRM to the serving cell (e.g., 416) of the source RAT. In one configuration, to generate the at least one MRM, the UE generates a MRM for each of the first cell and the second cell. In such a configuration, to send the at least one MRM, the UE sends the MRM for the second cell to the serving cell of the source RAT before sending the MRM for the first cell to the serving cell of the source RAT if the second cell is prioritized over the first cell. By sending the MRMs in this prioritized order, the network may receive the MRM associated with the stronger neighbor cell first, thus initiate handover to the stronger neighbor cell.

In one configuration, the first cell may be associated with a first target RAT and the second cell may be associated with a second target RAT. In such configuration, the second cell may be prioritized over the first cell based at least in part on a UE configuration. To generate the at least one MRM, the UE may generate a MRM for each of the first cell and the second cell. In such configuration, to send the at least one MRM, the UE may send the MRM for the second cell to the serving cell of the source RAT before sending the MRM for the first cell to the serving cell of the source RAT because the second cell is prioritized over the first cell based on the UE configuration. In one configuration, the UE configuration may be based on the UE's own information (e.g., the preference of the UE). In another configuration, the UE configuration may be based on information from the network (e.g., idle mode reselection priorities broadcast by the network), in conjunction with or instead of the UE's own information. In one configuration, the UE configuration may include a preference for service in a target RAT of the first or second cell, an idle mode reselection criteria relating to the first or second cell, a network setting, or any combination thereof.

Figure 6:
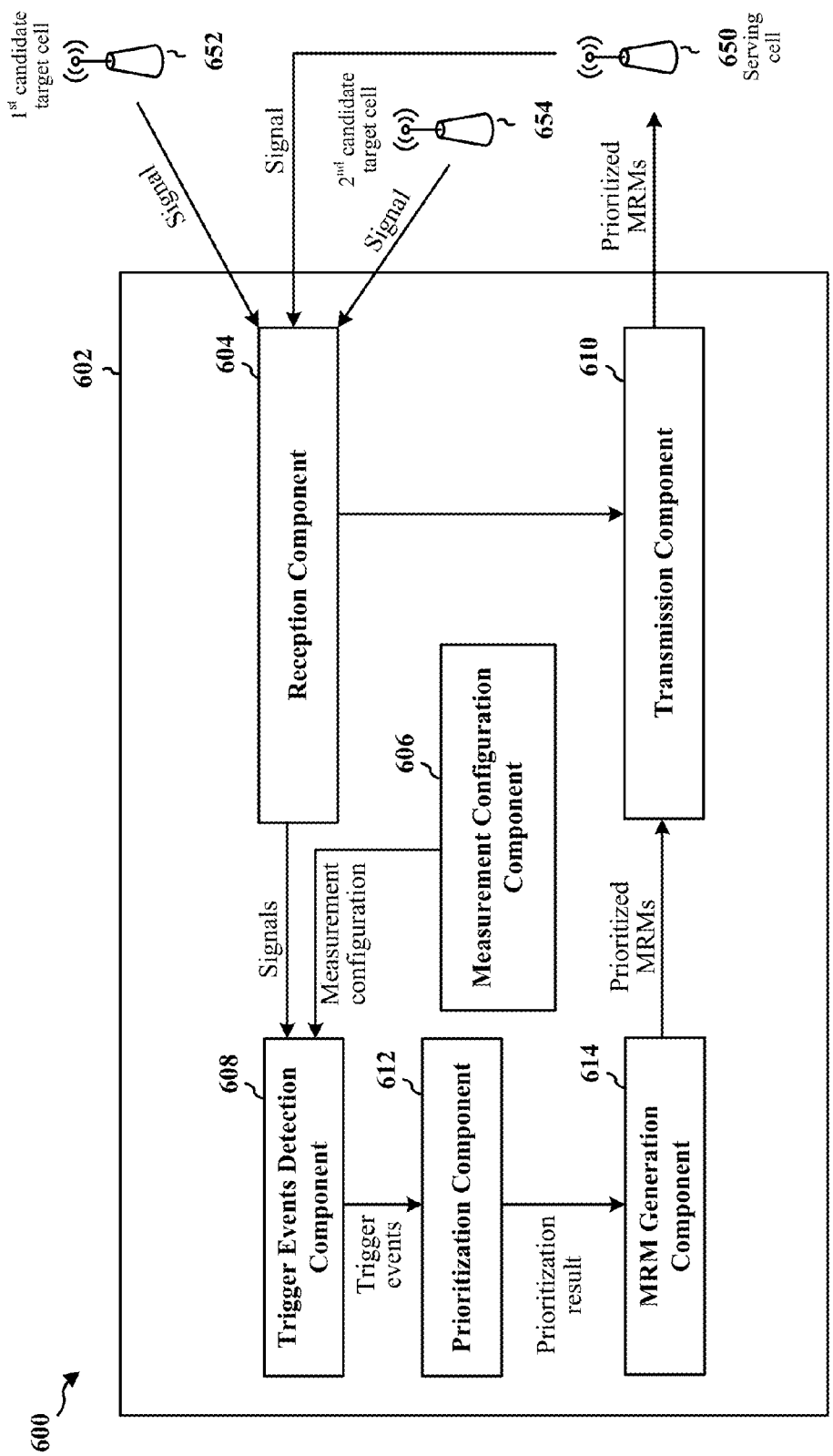
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus 602 may be a UE (e.g., the UE 402). The apparatus 602 includes a reception component 604 that receives signals from a serving cell 650, a first candidate target cell 652, and a second candidate target cell 654. In one configuration, the serving cell 650, the first candidate target cell 652, and the second candidate target cell 654 may be the serving cell 416, the first candidate target cell 418, and the second candidate target cell 420, respectively, described above with reference to FIG. 4. In one configuration, the serving cell 650 may be associated with a source RAT and the candidate target cells 652 and 654 may be associated with one or more target RATs that are different from the source RAT.

In one configuration, the apparatus 602 may include a transmission component 610 that transmits prioritized MRMs to the serving cell 650. In one configuration, the transmission component 610 may perform operations described above with reference to 510 of FIG. 5. In one configuration, the reception component 604 and the transmission component 610 may work together to coordinate the communication of the apparatus 602.

In one configuration, the apparatus 602 may include a measurement configuration component 606 that determines a measurement configuration relating to handover from the serving cell 650 of a source RAT to a cell of one or more target RATs (e.g., 652 or 654). In one configuration, the measurement configuration component 606 may perform operations described above with reference to 502 of FIG. 5.

In one configuration, the apparatus 602 may include a trigger events detection component 608 that measures signal strength of different cells based on signals received from the reception component 604, and detects trigger events associated with the first candidate target cell 652 and the second candidate target cell 654 of one or more target RATs and the serving cell 650 of the source RAT based on the measurement configuration received from the measurement configuration component 606. In one configuration, the trigger events detection component 608 may perform operations described above with reference to 504 of FIG. 5.

In one configuration, the apparatus 602 may include a measurement configuration component 606 that determines a measurement configuration relating to handover from the serving cell 650 of a source RAT to a cell of the one or more target RATs (e.g., 652 or 654). In one configuration, the measurement configuration component 606 may perform operations described above with reference to 502 of FIG. 5.

In one configuration, the apparatus 602 may include a prioritization component 612 that prioritizes among the candidate target cells 652 and 654 in response to the detected trigger events from the trigger events detection component 608. In one configuration, the prioritization component 612 may perform operations described above with reference to 506 of FIG. 5.

In one configuration, the apparatus 602 may include a MRM generation component 614 that generates at least one MRM based on the result of the prioritizing received from the prioritization component 612. The MRM generation component 614 sends the prioritized MRMs to the transmission component 610. In one configuration, the MRM generation component 614 may perform operations described above with reference to 508 of FIG. 5.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
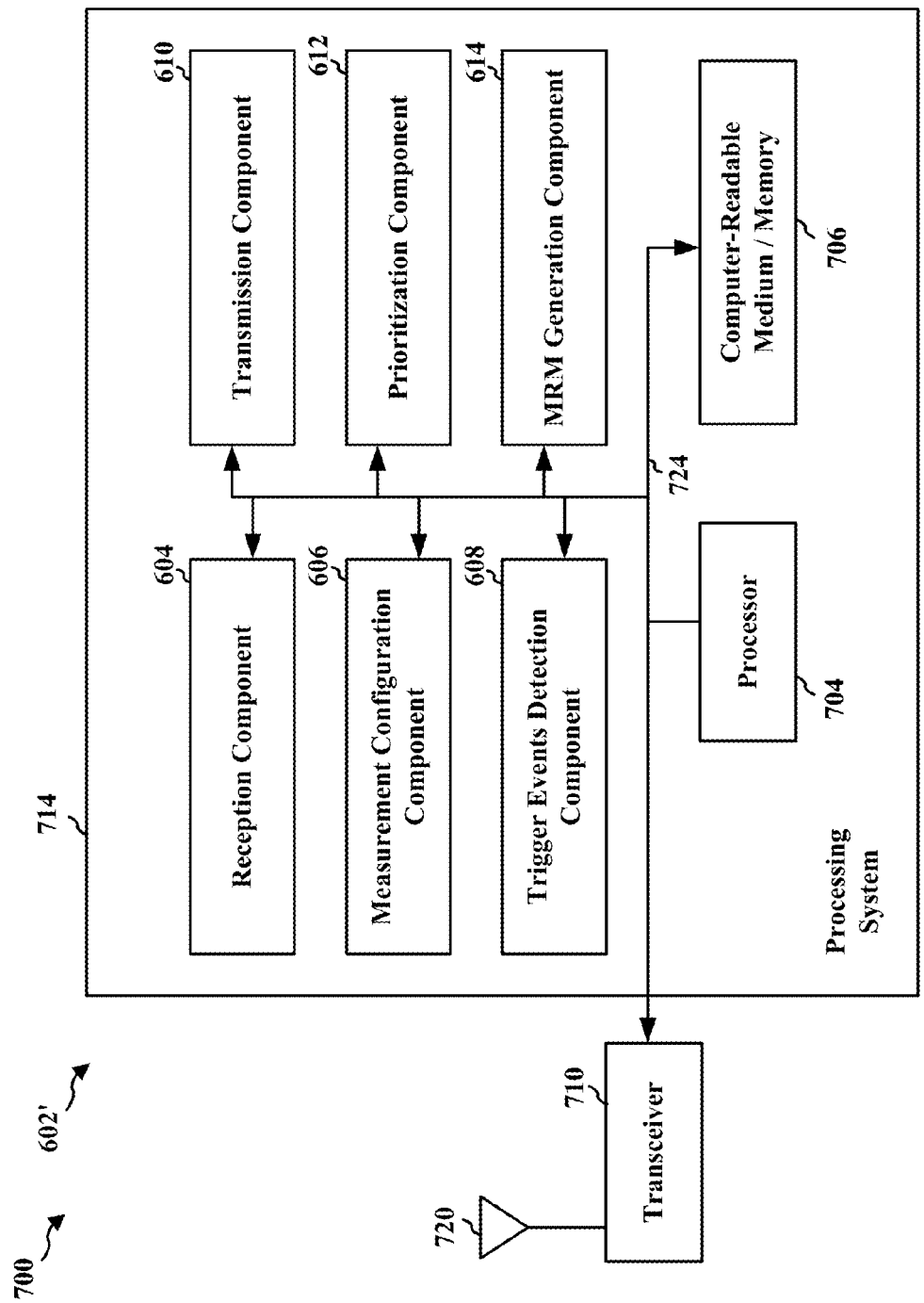
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612, 614, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 610, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610, 612, 614. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359.

In one configuration, the apparatus 602/602' for wireless communication includes means for determining a measurement configuration relating to handover from a cell of a source RAT to a cell of one or more target RATs. In one configuration, the means for determining a measurement configuration relating to handover from a cell of a source RAT to a cell of one or more target RATs may be performed by the measurement configuration component 606 or the processor 704. In one configuration, the means for determining a measurement configuration relating to handover from a cell of a source RAT to a cell of one or more target RATs may perform operations described above with reference to 502 of FIG. 5.

In one configuration, the apparatus 602/602' may include means for detecting trigger events associated with a first cell and a second cell of the one or more target RATs and a serving cell of the source RAT based on the measurement configuration. In one configuration, the means for detecting trigger events associated with a first cell and a second cell of the one or more target RATs and a serving cell of the source RAT based on the measurement configuration may be performed by the trigger events detection component 608 or the processor 704. In one configuration, the means for detecting trigger events associated with a first cell and a second cell of the one or more target RATs and a serving cell of the source RAT based on the measurement configuration may perform operations described above with reference to 504 of FIG. 5.

In one configuration, the apparatus 602/602' may include means for prioritizing among the first and second cells in response to the detected trigger events. In one configuration, the means for prioritizing among the first and second cells in response to the detected trigger events may be performed by the prioritization component 612 or the processor 704. In one configuration, the means for prioritizing among the first and second cells in response to the detected trigger events may perform operations described above with reference to 506 of FIG. 5. In one configuration, the second cell may be prioritized over the first cell and the means for prioritizing may be configured to operate based at least in part on the received signal strength of the second cell exceeding the received signal strength of the first cell. In one configuration, the second cell may be prioritized over the first cell and the means for prioritizing may be configured to operate based at least in part on a UE configuration. In one configuration, the means for prioritizing may be configured to operate during a time-to-trigger interval associated with the serving cell of the source RAT.

In one configuration, the apparatus 602/602' may include means for generating at least one MRM based on a result of the prioritizing. In one configuration, the means for generating at least one MRM based on a result of the prioritizing may be performed by the MRM generation component 614 or the processor 704. In one configuration, the means for generating at least one MRM based on a result of the prioritizing may perform operations described above with reference to 508 of FIG. 5. In one configuration, the means for generating the at least one MRM may be configured to generate a single MRM for the second cell that is prioritized over the first cell.

In one configuration, the apparatus 602/602' may include means for sending the at least one MRM to the serving cell of the source RAT. In one configuration, the means for sending the at least one MRM to the serving cell of the source RAT may be performed by the transceiver 710, the one or more antennas 720, the transmission component 610, or the processor 704. In one configuration, the means for sending the at least one MRM to the serving cell of the source RAT may perform operations described above with reference to 510 of FIG. 5.

In one configuration, the means for generating the at least one MRM may be configured to generate a MRM for each of the first cell and the second cell. In such configuration, the means for sending the at least one MRM may be configured to send the MRM for the second cell to the serving cell of the source RAT before sending the MRM for the first cell to the serving cell of the source RAT.

The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining, by the UE, a measurement configuration relating to handover from a cell of a source radio access technology (RAT) to a cell of one or more target RATs, wherein the source RAT is different from the one or more target RATs;
   detecting trigger events associated with a first cell and a second cell of the one or more target RATs and a serving cell of the source RAT based on the measurement configuration, the first cell and the second cell being associated with different frequency bands;
   prioritizing, by the UE, the first cell and the second cell in response to the detected trigger events;
   generating at least one measurement report message (MRM) based on a result of the prioritizing; and
   sending the at least one MRM to the serving cell of the source RAT.

2. The method claim 1, wherein the measurement configuration comprises one or more thresholds relating to received signal strengths of signals from cells in the respective source and target RATs, wherein the measurement configuration comprises a same threshold for the first and second cells of the one or more target RATs.

3. The method of claim 1, wherein the prioritizing is performed during a time-to-trigger interval associated with the serving cell of the source RAT.

4. The method of claim 1, wherein the first and second cells comprise different frequency bands of a same target RAT.

5. The method of claim 4, wherein the second cell is prioritized over the first cell and wherein the prioritizing is based at least in part on a received signal strength of the second cell exceeding a received signal strength of the first cell.

6. The method of claim 5, wherein the generating of the at least one MRM comprises generating a single MRM for the second cell.

7. The method of claim 5, wherein the generating of the at least one MRM comprises generating a MRM for each of the first cell and the second cell, wherein the sending of the at least one MRM comprises sending the MRM for the second cell to the serving cell of the source RAT before sending the MRM for the first cell to the serving cell of the source RAT.

8. The method of claim 1, wherein the first cell is associated with a first target RAT and the second cell is associated with a second target RAT.

9. The method of claim 8, wherein the prioritizing is based at least in part on a UE configuration, wherein the UE configuration comprises a preference for service in a target RAT of the first or second cell, an idle mode reselection criteria relating to the first or second cell, a network setting, or any combination thereof.

10. The method of claim 9, wherein the generating of the at least one MRM comprises generating a MRM for each of the first cell and the second cell, wherein the sending of the at least one MRM comprises sending the MRM for the second cell to the serving cell of the source RAT before sending the MRM for the first cell to the serving cell of the source RAT.

11. An apparatus for wireless communication, the apparatus being a user equipment (UE), comprising:
    means for determining a measurement configuration relating to handover from a cell of a source radio access technology (RAT) to a cell of one or more target RATs, wherein the source RAT is different from the one or more target RATs;
    means for detecting trigger events associated with a first cell and a second cell of the one or more target RATs and a serving cell of the source RAT based on the measurement configuration, the first cell and the second cell being associated with different frequency bands;
    means for prioritizing the first cell and the second cell in response to the detected trigger events;
    means for generating at least one measurement report message (MRM) based on a result of the prioritizing; and
    means for sending the at least one MRM to the serving cell of the source RAT.

12. The apparatus claim 11, wherein the measurement configuration comprises one or more thresholds relating to received signal strengths of signals from cells in the respective source and target RATs, wherein the measurement configuration comprises a same threshold for the first and second cells of the one or more target RATs.

13. The apparatus of claim 11, wherein the means for prioritizing is configured to operate during a time-to-trigger interval associated with the serving cell of the source RAT.

14. The apparatus of claim 11, wherein the first and second cells comprise different frequency bands of a same target RAT.

15. The apparatus of claim 14, wherein the second cell is prioritized over the first cell and wherein the means for prioritizing is configured to operate based at least in part on a received signal strength of the second cell exceeding a received signal strength of the first cell.

16. The apparatus of claim 15, wherein the means for generating the at least one MRM is configured to generate a single MRM for the second cell.

17. The apparatus of claim 15, wherein the means for generating the at least one MRM is configured to generate a MRM for each of the first cell and the second cell, wherein the means for sending the at least one MRM is configured to send the MRM for the second cell to the serving cell of the source RAT before sending the MRM for the first cell to the serving cell of the source RAT.

18. The apparatus of claim 11, wherein the first cell is associated with a first target RAT and the second cell is associated with a second target RAT.

19. The apparatus of claim 18, wherein the second cell is prioritized over the first cell and wherein the means for prioritizing is configured to operate based at least in part on a UE configuration, wherein the UE configuration comprises a preference for service in a target RAT of the first or second cell, an idle mode reselection criteria relating to the first or second cell, a network setting, or any combination thereof.

20. The apparatus of claim 19, wherein the means for generating the at least one MRM is configured to generate a MRM for each of the first cell and the second cell, wherein the means for sending the at least one MRM is configured to send the MRM for the second cell to the serving cell of the source RAT before sending the MRM for the first cell to the serving cell of the source RAT.

21. An apparatus for wireless communication, the apparatus being a user equipment (UE), comprising:
a memory; and
at least one processor coupled to the memory and configured to:
determine a measurement configuration relating to handover from a cell of a source radio access technology (RAT) to a cell of one or more target RATs, wherein the source RAT is different from the one or more target RATs;
detect trigger events associated with a first cell and a second cell of the one or more target RATs and a serving cell of the source RAT based on the measurement configuration, the first cell and the second cell being associated with different frequency bands;
prioritize the first cell and the second cell in response to the detected trigger events;
generate at least one measurement report message (MRM) based on a result of the prioritizing; and
send the at least one MRM to the serving cell of the source RAT.

22. The apparatus claim 21, wherein the measurement configuration comprises one or more thresholds relating to received signal strengths of signals from cells in the respective source and target RATs, wherein the measurement configuration comprises a same threshold for the first and second cells of the one or more target RATs.

23. The apparatus of claim 21, wherein the at least one processor is configured to prioritize during a time-to-trigger interval associated with the serving cell of the source RAT.

24. The apparatus of claim 21, wherein the first and second cells comprise different frequency bands of a same target RAT.

25. The apparatus of claim 24, wherein the second cell is prioritized over the first cell and wherein the at least one processor is configured to prioritize based at least in part on a received signal strength of the second cell exceeding a received signal strength of the first cell.

26. The apparatus of claim 25, wherein, to generate the at least one MRM, the at least one processor is configured to generate a single MRM for the second cell.

27. The apparatus of claim 25, wherein, to generate the at least one MRM, the at least one processor is configured to generate a MRM for each of the first cell and the second cell, wherein, to send the at least one MRM, the at least one processor is configured to send the MRM for the second cell to the serving cell of the source RAT before sending the MRM for the first cell to the serving cell of the source RAT.

28. The apparatus of claim 21, wherein the first cell is associated with a first target RAT and the second cell is associated with a second target RAT.

29. The apparatus of claim 28, wherein the second cell is prioritized over the first cell and wherein the at least one processor is configured to prioritize based at least in part on a UE configuration, wherein the UE configuration comprises a preference for service in a target RAT of the first or second cell, an idle mode reselection criteria relating to the first or second cell, a network setting, or any combination thereof.

30. A non-transitory computer-readable medium storing computer executable code, comprising code to:
determine a measurement configuration relating to handover from a cell of a source radio access technology (RAT) to a cell of one or more target RATs, wherein the source RAT is different from the one or more target RATs;
detect trigger events associated with a first cell and a second cell of the one or more target RATs and a serving cell of the source RAT based on the measurement configuration, the first cell and the second cell being associated with different frequency bands;
prioritize the first cell and the second cell in response to the detected trigger events;
generate at least one measurement report message (MRM) based on a result of the prioritizing; and
send the at least one MRM to the serving cell of the source RAT.

* * * * *